US010759634B2

(12) United States Patent
Abdallah et al.

(10) Patent No.: US 10,759,634 B2
(45) Date of Patent: Sep. 1, 2020

(54) ELECTROMECHANICAL SYSTEM FOR INTERACTION WITH AN OPERATOR

(71) Applicants: GM Global Technology Operations LLC, Detroit, MI (US); Université Laval, Quebec (CA)

(72) Inventors: Muhammad E. Abdallah, Rochester Hills, MI (US); Clement Gosselin, Quebec (CA); Thierry Laliberte, Quebec (CA); Simon Foucault, Quebec (CA); Pascal Labrecque, Quebec (CA); James W. Wells, Rochester Hills, MI (US); Jerome Landure, Quebec (CA)

(73) Assignees: GM Global Technology Operations LLC, Detroit, MI (US); Université Laval, Quebec (CA)

( * ) Notice: Subject to any disclaimer, the term of this patent is extended or adjusted under 35 U.S.C. 154(b) by 323 days.

(21) Appl. No.: 15/803,202

(22) Filed: Nov. 3, 2017

(65) Prior Publication Data
US 2018/0079629 A1    Mar. 22, 2018

Related U.S. Application Data

(63) Continuation-in-part of application No. 15/284,043, filed on Oct. 3, 2016, now Pat. No. 10,626,963, and
(Continued)

(51) Int. Cl.
*G06F 17/00* (2019.01)
*B66C 13/08* (2006.01)
(Continued)

(52) U.S. Cl.
CPC ............... *B66C 13/08* (2013.01); *B25J 1/02* (2013.01); *B25J 5/04* (2013.01); *B25J 9/0048* (2013.01);
(Continued)

(58) Field of Classification Search
CPC ......... B66C 13/08; B66C 13/46; B66C 13/48; B66C 17/04; B25J 1/02; B25J 5/04;
(Continued)

(56) References Cited

U.S. PATENT DOCUMENTS 4,937,759 A  *  6/1990  Vold ..................... B25J 9/1602
                                                     700/262
5,179,525 A  *  1/1993  Griffis ................. B23Q 1/5462
                                                      434/55
(Continued)

FOREIGN PATENT DOCUMENTS

CN          201073767 Y      6/2008
CN          102292194 A     12/2011
(Continued)

*Primary Examiner* — Ronnie M Mancho
(74) *Attorney, Agent, or Firm* — Quinn IP Law

(57) ABSTRACT

An electromechanical system operates through physical interaction with an operator, and includes a plurality of joints providing multiple degrees of freedom (DOF), including actuated joints and unactuated joints. The unactuated joints are distal with respect to the actuated joints and are in redundant DOF to the actuated joints. The system includes a plurality of actuators each configured to actuate one or more of the actuated joints, and a plurality of sensors each positioned with respect to a respective one of the actuated and unactuated joints. Each sensor is configured to measure corresponding joint data indicative of a position or angle of the respective actuated or unactuated joints. A controller in communication with the sensors receives the measured joint data as feedback signals, generates control signals using the feedback signals, and transmits the control signals to the actuators to thereby control an actuation state of the actuators.

20 Claims, 4 Drawing Sheets

Related U.S. Application Data a continuation-in-part of application No. 14/811,072, filed on Jul. 28, 2015, now abandoned.

(60) Provisional application No. 62/243,455, filed on Oct. 19, 2015, provisional application No. 62/035,014, filed on Aug. 8, 2014.

(51) Int. Cl.

| | | |
|---|---|---|
| *B25J 13/08* | (2006.01) | |
| *B25J 9/04* | (2006.01) | |
| *B25J 9/10* | (2006.01) | |
| *B25J 9/16* | (2006.01) | |
| *B25J 1/02* | (2006.01) | |
| *B25J 5/04* | (2006.01) | |
| *B66C 13/48* | (2006.01) | |
| *B66C 13/46* | (2006.01) | |
| *B66C 17/04* | (2006.01) | |
| *B25J 9/00* | (2006.01) | |
| *B25J 17/02* | (2006.01) | |

(52) U.S. Cl.
CPC ............ *B25J 9/046* (2013.01); *B25J 9/1065* (2013.01); *B25J 9/1615* (2013.01); *B25J 13/089* (2013.01); *B25J 17/0208* (2013.01); *B66C 13/46* (2013.01); *B66C 13/48* (2013.01); *B66C 17/04* (2013.01); *B25J 9/0018* (2013.01)

(58) Field of Classification Search
CPC ........ B25J 9/0048; B25J 9/046; B25J 9/1065; B25J 9/1615; B25J 13/089; B25J 17/0208; B25J 9/0018
USPC .................................................. 700/245, 257
See application file for complete search history.

(56) References Cited

U.S. PATENT DOCUMENTS

| | | | | |
|---|---|---|---|---|
| 5,377,310 A * | 12/1994 | Jain | ................ | B25J 9/1615 |
| | | | | 700/260 |
| 5,499,320 A | 3/1996 | Backes et al. | | |
| 5,529,159 A | 6/1996 | Troccaz | | |
| 5,887,121 A * | 3/1999 | Funda | ................ | B25J 9/1648 |
| | | | | 600/204 |
| 6,204,620 B1 * | 3/2001 | McGee | ................ | B25J 9/1679 |
| | | | | 254/1 |
| 6,377,011 B1 * | 4/2002 | Ben-Ur | ................ | G06F 3/016 |
| | | | | 318/566 |
| 6,394,731 B1 * | 5/2002 | Konosu | ................ | B25J 5/04 |
| | | | | 414/5 |
| 6,522,952 B1 * | 2/2003 | Arai | ................ | B25J 9/1679 |
| | | | | 414/591 |
| 6,702,805 B1 * | 3/2004 | Stuart | ................ | B25J 9/1065 |
| | | | | 600/102 |
| 6,786,896 B1 * | 9/2004 | Madhani | ................ | B25J 9/1615 |
| | | | | 606/1 |
| 7,950,306 B2 * | 5/2011 | Stuart | ................ | B25J 9/106 |
| | | | | 74/490.01 |
| 7,992,733 B2 | 8/2011 | Laliberte et al. | | |
| 8,181,799 B2 | 5/2012 | Laliberte et al. | | |
| 8,985,354 B2 | 3/2015 | Lecours et al. | | |
| 9,060,792 B2 * | 6/2015 | Jaspers | ................ | A61B 34/71 |
| 9,235,214 B2 | 1/2016 | Anderson | | |
| 9,308,645 B2 * | 4/2016 | Lecours | ................ | B25J 9/163 |
| 9,333,042 B2 * | 5/2016 | Diolaiti | ................ | A61B 34/37 |
| 9,359,176 B2 | 6/2016 | Gao et al. | | |
| 9,480,534 B2 * | 11/2016 | Bowling | ................ | B25J 13/00 |
| 9,630,815 B2 * | 4/2017 | Gao | ................ | B66C 17/00 |
| 9,895,798 B2 * | 2/2018 | Helmer | ................ | B25J 9/106 |
| 10,407,183 B2 * | 9/2019 | Potters | ................ | B65G 9/002 |
| 2004/0026349 A1 * | 2/2004 | Colgate | ................ | B66C 17/00 |
| | | | | 212/284 |
| 2011/0071675 A1 * | 3/2011 | Wells | ................ | G06K 9/3216 |
| | | | | 700/250 |
| 2013/0006417 A1 * | 1/2013 | Sanders | ................ | H04L 47/13 |
| | | | | 700/245 |
| 2013/0112641 A1 | 5/2013 | Laliberte et al. | | |
| 2015/0351857 A1 * | 12/2015 | Vander Poorten | ...... | B25J 18/007 |
| | | | | 606/130 |
| 2016/0008988 A1 * | 1/2016 | Kennedy | ................ | B25J 9/06 |
| | | | | 414/738 |
| 2016/0039093 A1 * | 2/2016 | Abdallah | ................ | B25J 9/1687 |
| | | | | 700/257 |
| 2016/0159420 A1 * | 6/2016 | Ward | ................ | B62D 57/02 |
| | | | | 180/8.6 |
| 2016/0221189 A1 * | 8/2016 | Nilsson | ................ | B25J 9/1653 |
| 2017/0013778 A1 | 1/2017 | Borry et al. | | |
| 2017/0183202 A1 | 6/2017 | Gao et al. | | |
| 2018/0079629 A1 * | 3/2018 | Abdallah | ................ | B25J 9/0048 |

FOREIGN PATENT DOCUMENTS

| | | |
|---|---|---|
| CN | 103496633 A | 1/2014 |
| CN | 103640022 A | 3/2014 |
| CN | 103919591 A | 7/2014 |
| CN | 104622573 A | 5/2015 |
| CN | 104781050 A | 7/2015 |
| EP | 0595291 A1 | 5/1994 |
| JP | 200933974 A | 2/2009 |
| WO | 9950721 A1 | 10/1999 |
| WO | 2014018983 A1 | 1/2014 |

* cited by examiner

ELECTROMECHANICAL SYSTEM FOR INTERACTION WITH AN OPERATOR

CROSS-REFERENCE TO RELATED APPLICATIONS

This application is a continuation in part of U.S. patent application Ser. No. 15/284,043, filed on Oct. 3, 2016, which claims priority to Provisional Application No. 62/243,455, filed Oct. 19, 2015, and U.S. patent application Ser. No. 14/811,072, filed Jul. 28, 2015, which claims priority to U.S. Provisional Application No. 62/035,014, filed on Aug. 8, 2014, which are hereby incorporated by reference in their entireties.

INTRODUCTION

Force and torque loads of a given work task vary with the particular task being performed. For example, certain manufacturing or manual assembly processes require an operator to use a handheld power tool such as an electric torque wrench or a nut driver. In such a process, the operator typically supports the full weight of the tool, locates an individual fastener, and provides a reaction torque as the fasteners are tightened. Another manual work task is the placement and installation of a pane of glass into a body panel. Task loads typically experienced during the execution of such a task may include grasping, transporting, and rotating the glass pane into proper position while the operator bears the weight of the glass pane. Material handling, product assembly, and other manufacturing or assembly tasks likewise can present unique task loads borne primarily by the operator.

SUMMARY

An electromechanical system is disclosed herein that is operable through physical interaction with an operator, e.g., in conducting a manual work task in which the operator acts on an object such as a work tool, workpiece, or payload. Thus, a point of interaction exists between the operator and the electromechanical system, for instance with the operator applying a manual force to the object directly or via an end-effector (distal link) of the system. Interaction between the operator and the electromechanical system is distinguished herein from tele-operated systems in which an output force or a particular movement of an actively-controlled/actuated end-effector is remotely commanded by the operator via transmission of an electronic control signal.

The electromechanical system is intended to support the weight of the above-noted object as the operator displaces the object and performs the work task. In order to accomplish this, the electromechanical system is configured to provide a desired amount of linear/translational compliance. The term "compliance" as used in the context of the present disclosure refers to a degree of displacement resulting from the operator's applied force, with increased compliance resulting in greater displacement for a given amount of force. In other words, the operator's perceived effort is reduced when the operator moves or otherwise acts on the static load.

In a particular embodiment, the electromechanical system has a plurality of joints providing multiple degrees of freedom (DOF), with the joints including both actuated (actuator-driven) joints and unactuated (passively-adjusted or manually-adjusted) joints. The unactuated joints are distal with respect to the actuated joints, and are redundant DOF with respect to the actuated joints. The term "distal" in the present context refers to a location that is closer to the end of a serial chain of links of the electromechanical system, i.e., where the operator interacts with the electromechanical system, than to the beginning of such a chain, e.g., where a base is located to which the serial chain of links is ultimately connected. The electromechanical system also includes actuators configured to actuate one or more of the actuated joints, and sensors positioned with respect the actuated and unactuated joints. Each sensor measures corresponding joint data indicative of a joint position or angle of the respective joints. Additionally, a controller in communication with the sensors receives the measured joint data as feedback signals, generates control signals using the feedback signals, and transmits the control signals to the actuators to thereby control an actuation state of the actuators, and thereby provide a desired displacement and/or force at the point of interaction.

The electromechanical system may include a multi-axis serial robot having at least some of the actuated joints, for instance a multi-axis industrial robot having six degrees of freedom. Alternatively, the electromechanical system may include an overhead linear rail system having some or all of the actuated joints.

One or more of the unactuated joints may be embodied as linear slides.

The unactuated joints may include a passive vertical translation joint that is statically balanced such that an equilibrium position of the electromechanical system is maintained in the absence of the physical interaction with the operator. The passive vertical translation joint may be statically balanced via mechanical springs, load balancers, and/or pneumatic cylinders.

The unactuated joints may be embodied as joints of a pendulum arrangement, or joints of a parallel link or parallelogram link arrangement. As used herein, "parallelogram link arrangement" refers to a four-bar linkage connected through revolute joints, where two sets of opposing links are parallel to each other and of equal length. This results in an output link, e.g., the "lower link" as described herein, that translates in a plane without changing orientation. The parallel link arrangement may include parallel planar upper and lower members that are rotatably connected to each other via arm linkages and universal joints. This allows the output link to translate in two dimensions. In an example embodiment, the upper and lower members are triangular members connected to each other by three of the arm linkages through six of the universal joints. The universal joints may be embodied as two non-parallel revolute joints providing two DOF. The revolute joints may be physically integrated, or may be embodied as two physically distinct revolute joints. This example embodiment is considered a two DOF "closed-chain mechanism." A "closed-chain mechanism" as that term is used herein refers to a mechanism with multiple paths of articulated linkages separately connecting the output link and the input ("upper") link, providing the output link with multiple DOF. An arrangement of multiple single DOF mechanisms placed in series is not a closed-chain mechanism.

Some of the unactuated joints may include spring elements configured to provide a restoring force to an equilibrium position in the absence of the physical interaction with the operator.

Also disclosed herein is an articulated compliance mechanism for use with a robotic mechanism in a physical interaction with an operator. The robotic mechanism has actuated joints driven via one or more actuators. The articulated compliance mechanism in this embodiment includes linkages joined via unactuated joints, the unactuated joints being distal with respect to the actuated joints and lying in redundant DOF with respect to the actuated joints. Additionally, the compliance mechanism includes sensors each positioned with respect to a respective actuated or unactuated joint, and each configured to measure corresponding joint data indicative of a position or angle of the respective joint. A controller in communication with the sensors receives the measured joint data as feedback signals, generates control signals using the feedback signals, and transmits the control signals to the actuators to thereby control an actuation state of the actuators.

The above features and advantages, and other features and advantages of the present disclosure, will be readily apparent from the following detailed description of the embodiment(s) and best mode(s) for carrying out the disclosure when taken in connection with the accompanying drawings and appended claims.

Figure 1:
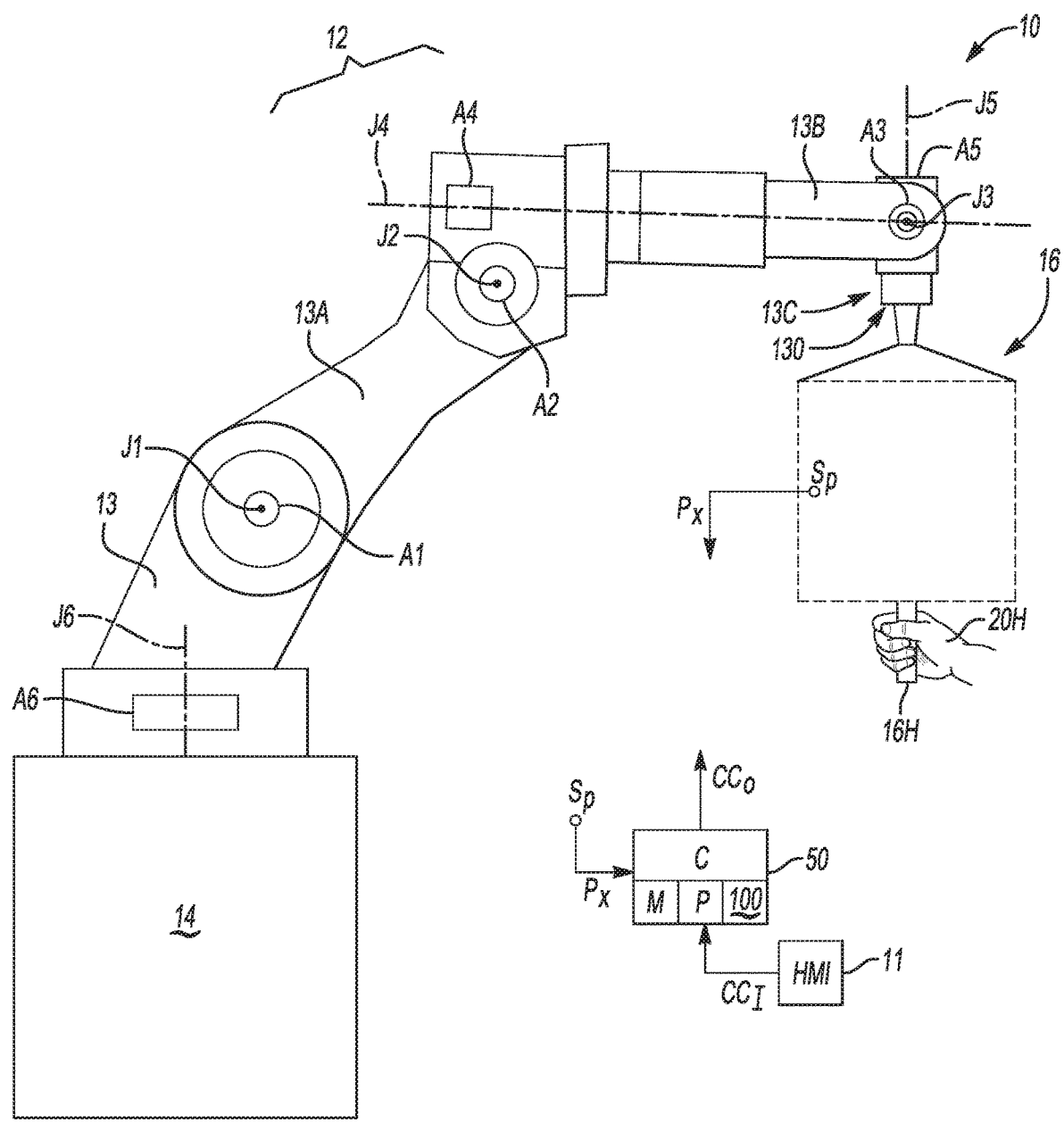
FIG. 1 is a schematic side view illustration of an example electromechanical system operating through physical interaction with an operator in accordance with an embodiment of the present disclosure.

Representative embodiments are shown in the drawings and described in detail herein. Novel aspects of the present disclosure are not limited to the particular forms illustrated in the appended drawings. Rather, the disclosure covers modifications, equivalents, combinations, and alternative embodiments falling within the scope of the disclosure as defined by the appended claims. The drawings are in simplified form and are not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure in any manner.

DETAILED DESCRIPTION

Figure 2:
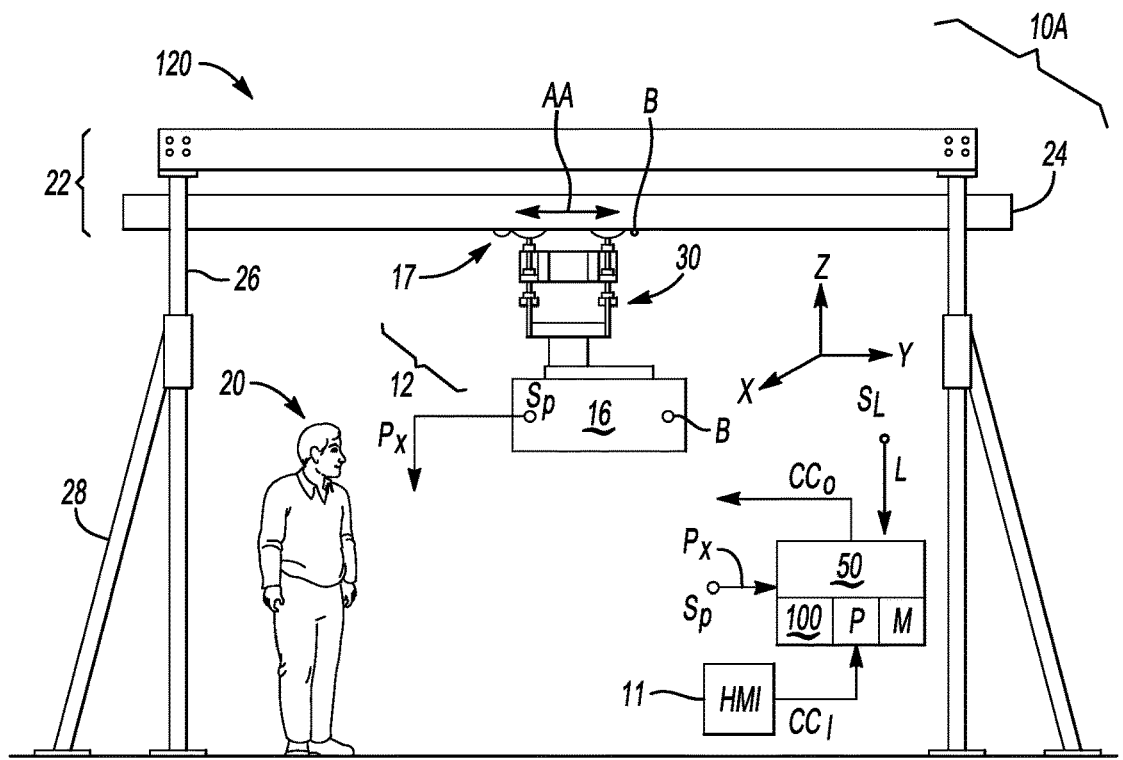
FIGS. 2 and 3 are schematic side view illustrations of an alternative overhead embodiment of the electromechanical system shown in FIG. 1.
Figure 3:
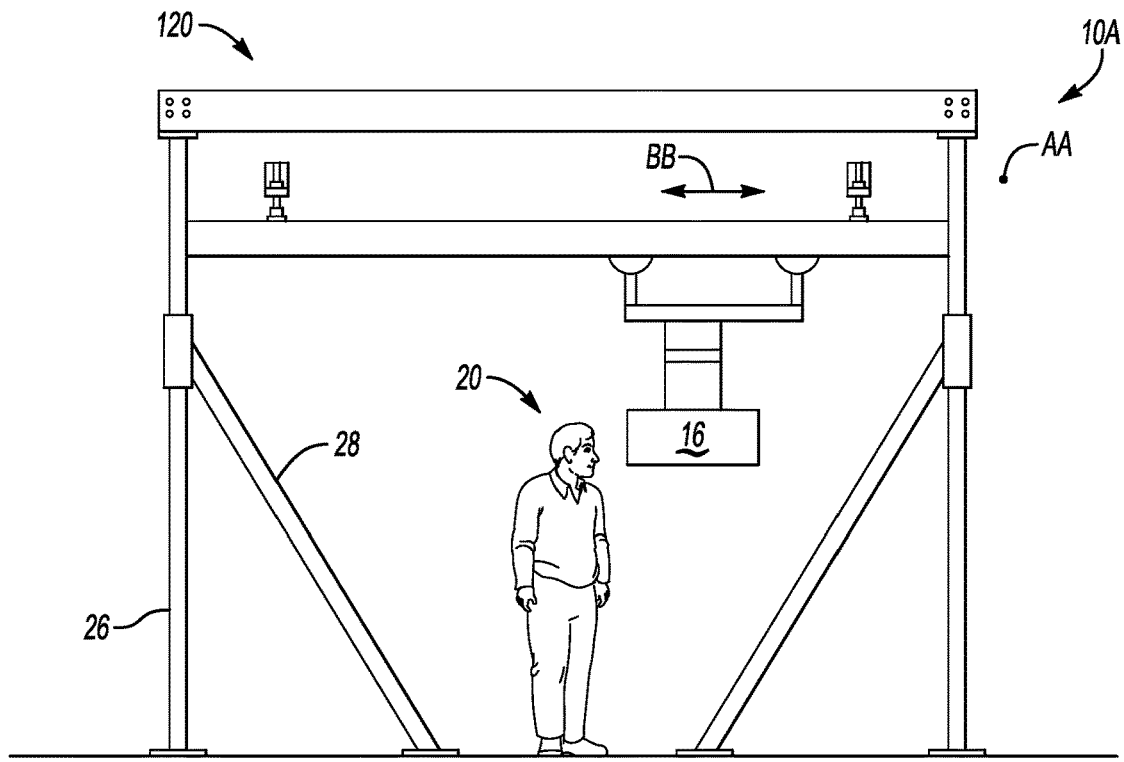

Referring to the drawings, wherein the same or similar reference numerals refer to the same or like structure throughout the various Figures, an electromechanical system 10 and 10A is shown in FIGS. 1-3 has a robotic mechanism 12 and an articulated compliance mechanism 16 that together may support and position an object 32 (see FIGS. 2-4), e.g., a payload, work tool, handle, or other object. The electromechanical system 10 includes an articulated compliance mechanism 16 as shown schematically as a box in FIGS. 1-3 for illustrative simplicity. Example embodiments of the articulated compliance mechanism 16 are described in detail below with reference to FIGS. 4-6.

Figure 4:
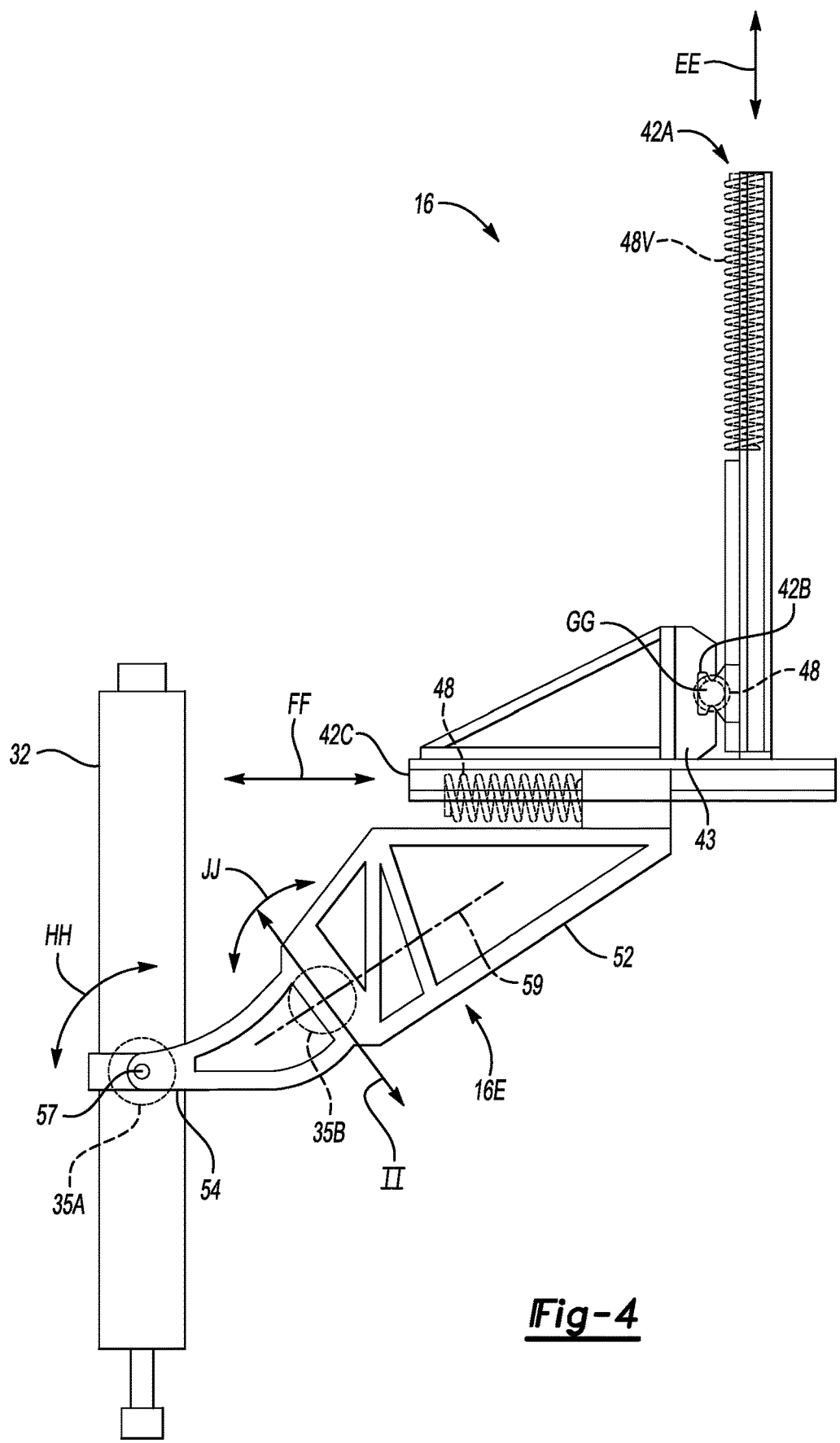
FIG. 4 is a schematic side view illustration of an embodiment of an articulated compliance mechanism of the electromechanical system shown in FIGS. 1-3.

The articulated compliance mechanism 16 disclosed herein is a low-impedance, articulated mechanism configured to assist a human operator, shown partially at 20H in FIG. 1 and at 20 in FIGS. 2 and 3, when the operator 20 performs an assembly task. Such a task may encompass acting on the handle 16H or another point of interaction with the articulated compliance mechanism 16 in lifting, supporting, and/or positioning the object 32, such as an example work tool as shown in FIG. 4, or alternatively a work piece moved and assembled with respect to another component or part. The object 32 may also encompass various grasped or supported objects, including but not limited to work pieces such as sheets of metal, panes of glass, other types of work tools, components, and the like.

The articulated compliance mechanism 16 has two primary functions: (1) to reduce or eliminate targeted task loads needed for completing the manual assembly task, and (2) to allow the operator 20 to more easily manipulate the object 32 with a low impedance level as perceived by the operator 20. To achieve the goal of reduced task load, both the robotic mechanism 12 and the articulated compliance mechanism 16 may be arranged in series. Lower perceived impedance is achieved due to the operator 20 only having to push or move the relatively small/lightweight articulated compliance mechanism 16 rather than the entire robotic mechanism 12. The robotic mechanism 12 is nevertheless configured to expand the range of motion of the articulated compliance mechanism 16, and thus of a point of interaction with the operator 20. Hence, the operator 20 sees only the perceived impedance of the smaller compliance mechanism while enjoying the full range of motion of the larger robotic mechanism.

The articulated compliance mechanism 16, when used as part of the electromechanical system 10 or 10A, assists the operator 20, whose hand 20H is shown in FIG. 1, in physically interacting with the object 32. The articulated compliance mechanism 16 includes a plurality of joints providing multiple degrees of freedom (DOF), with various actively-driven/actuated joints and various passive/manually-adjusted, or other unactuated joints. The unactuated joints of the electromechanical system 10, 10A are distal with respect to the actuated joints and provide DOF that are redundant with the DOF provided by the actuated joints. Multiple joints of the electromechanical system 10 or 10A may produce motion in the same DOF. When this happens, such joints are considered herein to be "redundant" with respect to that particular DOF.

Specifically, the robotic mechanism 12 may include an example plurality of actuated joints J1, J2, J3, J4, J5, and J6 each actuated or driven by one or more respective joint actuators A1, A2, A3, A4, A5, and A6, thus providing the robotic mechanism 12 with three or more actuator-powered or actuated DOF. The robotic mechanism 12 may be embodied as a multi-axis industrial robot as depicted in FIG. 1, or as an overhead gantry and rail system as shown in FIGS. 2-3, with the actuated joints J1, J2, J3, J4, J5, and J6 forming a serial robot in either embodiment.

In the non-limiting embodiment of FIG. 1, the robotic mechanism 12 may be a multi-axis serial robot having at least some of the actuated joints noted above. For instance, a base 14 may be mounted to a floor, wall, column, or ceiling support (not shown), with the base 14 coupled to a first arm segment 13 and rotatable about an axis corresponding to the actuated joint J6. For simplicity, the term "actuated joint" and "joint axis" will be used interchangeably hereinafter, with the understanding that the joint is the physical structure that rotates, pivots, bends, or otherwise moves with respect to the axis. The articulated compliance mechanism 16 as depicted in FIG. 1 is connected to the multi-axis robot at a distal mounting point or surface 130 thereof.

The first arm segment 13 is serially coupled to a second arm segment 13A and rotatable about joint axis J1. Additionally, a third arm segment 13B may be coupled to the second arm segment 13A and rotatable about joint axes J2 and J4, with the third arm segment 13B coupled to a fourth arm segment 13C at a distal end of the third arm segment 13B as shown. The fourth arm segment 13C may rotate about joint axes J3 and J5, with the example of FIG. 1 providing a typical six-DOF or six-axis robot.

Referring briefly to FIGS. 2 and 3, the robotic mechanism 12 of FIG. 1 may be alternatively configured as an overhead linear rail system 120. In such an embodiment, at least some of the actuated joints of the electromechanical system 10 or 10A are joints of the overhead linear rail system 120. Suspension linkages 30 are responsive to electronic control signals (arrow $CC_O$) from a controller (C) 50, with the controller 50 shown schematically in FIGS. 1 and 2. In the example embodiment of FIGS. 2 and 3, overhead support beams 22 have an active/actuated linear positioning mechanism, e.g., a two linear DOF gantry or overhead bridge crane having drive wheels 17 forming a trolley with the suspension linkages 30, and possibly providing a rotational DOF.

The support beams 22 may include one or more horizontal rails 24, vertical support beams 26, and angled support beams 28. The terms "horizontal" and "vertical" as used herein refer to orientation with respect to the XYZ Cartesian reference frame, with the Z axis being the vertical axis orthogonal to the horizontal X and Y axes, and the X and Y axes being orthogonal with respect to each other. The beams 26 and 28 together support the weight of the horizontal rails 24 and any structure suspended therefrom, with the horizontal rails 24 positioned overhead with respect to the operator 20 in a standing position as shown. The drive wheels 17 may be actuated via motors, chains, belts, or the like (not shown) so that the articulated compliance mechanism 16 and supported object 32 translate along the horizontal rails 24 as indicated in FIG. 2 by double-headed arrow AA, or rotates as needed. The same drive wheels 17 and suspension linkages 30 may, in some embodiments, translate orthogonally with respect to the horizontal rails 24 as shown via double-headed arrow BB in FIG. 3.

The controller 50 of FIGS. 1 and 2 may be embodied as a digital computer having a processor (P) and memory (M). The memory (M) includes sufficient amounts of tangible, non-transitory memory, e.g., read only memory, flash memory, optical and/or magnetic memory, electrically-programmable read only memory, and the like. Memory (M) also includes sufficient transient memory such as random access memory, electronic buffers. Hardware of the controller 50 may include a high-speed clock, analog-to-digital and digital-to-analog circuitry, and input/output circuitry and devices, as well as appropriate signal conditioning and buffer circuitry. The memory (M) may be programmed with computer-readable instructions 100 enabling the controller 50 to control active joints, brakes, and locking mechanisms as needed, including to arrest motion of the robotic mechanism 12 or to temporarily prevent movement along a given axis if needed.

The controller 50 may include an optional human machine interface (HMI) 11 such as a touch screen to facilitate selection of different control modes of the robotic mechanism 12. The HMI device 11 may be programmed to allow the operator 20 to select a particular task, control mode, and associated control law as an input signal (arrow $CC_I$). For example, the actuated joints of the robotic mechanism 12, e.g., J1-J6 of FIG. 1, may be controlled in an autonomous mode where the actuated joints J1-J6 perform pre-programmed tasks independent of the operator 20 in order to reduce the non-value added efforts of the operator 20, e.g., to grossly position the articulated compliance mechanism 16 and, when present, the coupled object 32. For instance, the operator 20 could select a sequence of "select a pane of glass, latch onto the glass, move the latched pane to a door panel, and unlatch", with the particular control law corresponding to the control sequence. For force-intensive operations such as inserting a spark plug, the control law could include force amplification, such that the actuated joints J1-J6 amplify an applied force or torque from the operator 20 to reduce the load on the operator 20.

As part of the overall control of the electromechanical systems 10 and 10A, the controller 50 may receive position signals (arrow $P_X$) from a plurality of joint sensors ($S_P$) positioned with respect to each of the joint actuators A1, A2, A3, A4, A5, and A6. Additional joint position sensors ($S_P$) are positioned with respect to, i.e., on, in, or in close proximity to, the articulated compliance mechanism 16 to measure corresponding joint data indicative of a position or angle of the respective actuated or unactuated joints, and report the joint data to the controller 50. In this manner, the controller 50 is able to use position feedback in the overall motion control of the electromechanical system 10 or 10A. Additional input signals (arrow $CC_I$) may be received by the controller 50 such as selections of a particular task and/or preferred control mode by the operator 20 via the HMI device 11.

Also, as shown in FIG. 2, range limit signals (arrow L) may be sensed by one or more range limit sensors ($S_L$) disposed within the electromechanical system 10 or 10A, such as in close proximity to the various joint limits of the articulated compliance mechanism 16 and the robotic mechanism 12. The control signals (arrow $CC_O$) are transmitted by the controller 50 to the various joint actuators A1-A6, e.g., wireless or via low-voltage wires, in order to maintain desired relative positioning of the various active joints in the event such active joints are used.

When the articulated compliance mechanism 16 of FIGS. 1-3 reaches a range limit of any of its own joints, e.g., as detected by the range limit sensors ($S_L$) and reported to the controller 50 as the range limit signals (arrow L), the controller 50 may, as part of the control signals (arrow $CC_O$), command suppressing or arresting of motion of the robotic mechanism 12. For instance, the controller 50 may command an emergency stop (E-stop) of the robotic mechanism 12 by transmitting the control signals (arrow $CC_O$) to one or more brake actuators B (see FIG. 2) disposed at the various joints of the system 10, doing so in response to the range limit signals (arrow L). The range limit signals (arrow L) may contain dual channels for signal redundancy. Locking devices may be positioned at a corresponding revolute joint of the articulated compliance mechanism 16 described below to temporarily prevent motion along a given axis if so desired.

Further with respect to the articulated compliance mechanism 16, each joint position sensor ($S_P$) is configured to measure joint data indicative of a joint angle/position of a corresponding actuated or unactuated joint. In other words, the positions or angles of all of the joints of the electromechanical system 10, 10A are determined. The controller 50 is in communication with the sensors ($S_P$), and is configured to receive the measured joint positions (arrows $P_X$) as feedback signals, generate the control signals (arrow $CC_O$)

using the received measured joint positions, and transmit the control signals (arrow $CC_O$) to the joint actuators A1-A6 to thereby control an actuation state of the actuated joints.

Referring to FIG. 4, the articulated compliance mechanism 16 is depicted in a lightweight latticed embodiment, e.g., a framework of lightweight plastic members arranged generally as shown. The articulated compliance mechanism 16 has an end-effector 16E configured to securely grasp the object 32, in this case depicted as an example work tool. For instance, the end-effector 16E may be constructed of a lattice 52 of a task-appropriate material such as plastic, aluminum, or composite material. The end-effector 16E may be equipped with a gripper 54 suitable for grasping the object 32. The design of the lattice 52 and of the gripper 54 may vary with the design of the object 32.

The end-effector 16E may be modular and easily connected or disconnected to/from the robotic mechanism 12 or 120 of FIGS. 1-3. When changing over to another work task such as gripping and placing a pane of glass in the assembly of a door, the end-effector 16E may be quickly disconnected from the robotic mechanism 12 and replaced with another end-effector 16E having a task-suitable design, e.g., with adjustable or fixed linkages on which are disposed suction cups or rubberized fingers capable of gripping the pane of glass.

Various DOF of the end-effector 16E are visible from the perspective of FIG. 4. Slotted carriages 43 translate along respective first, second, and third linear slides 42A, 42B, and 42C. The first linear slide 42A may be a passive vertical translation joint. i.e., a joint that is vertically oriented and unactuated, with such a joint possibly being statically balanced such that an equilibrium position is maintained in the absence of the interaction with the operator 20. The second linear slide 42B may be horizontally oriented, i.e., orthogonally arranged with respect to the first linear slide 42A. The third linear slide 42C may be arranged orthogonally with respect to the second linear slide 42B. Each linear slide 42A, 42B, and 42C is received within a mating notch or slot of a respective slotted carriage 43 such that the operator 20 of FIGS. 1-3 is able to manually translate the end-effector 16E in multiple directions with respect to the robotic mechanism 12.

The slotted carriages 43 may be designed such that release of the slotted carriages 43 is sufficient to lock the slotted carriages 43 and a corresponding portion of the end-effector 16E in place at a desired position. Additionally, self-centering resilient members 48 such as springs, load balancers, or pneumatic cylinders may be used to assist in static balancing or centering of the slotted carriages 43, and to thus provide a restoring force for linear passive DOF. Self-centering resilient members 48V may also be used in vertical translational DOF to compensate for gravity. The presence of the resilient members 48, 48V does not change the passive/unactuated nature of the DOF. The translational DOF are provided via the three translatable slotted carriages 43. Two rotational DOF are provided along axes 57 and 59 as indicated by the double-headed arrows HH and II, respectively. Linear translation of a respective carriage 43 along linear slide 42A is along axis EE, and of linear slides 42B and 42C along axes GG and FF, respectively.

The joints of the end-effector 16E are unactuated, i.e., passively adjusted. However, at least one DOF of the end-effector 16E may be actuated in some optional embodiments. The unactuated/passive DOF of the articulated compliance mechanism 16 remain redundant with the actuated/active DOF. To that end, optional joint actuators 35A and 35B are shown with respect to axes 57 and 59. One or both joint actuators 35A and 35B may be used depending on the embodiment. Different combinations of DOF, and/or different combinations of passive versus active DOF, can be envisioned within the scope of the disclosure. The end-effector 16E may be balanced and/or may include light clamps (not shown) so as to hold the object 32 securely whenever the operator 20 releases the object 32.

In addition to the translational DOF described above, the end-effector 16E also includes first and second rotatable joints, with rotation of these joints indicated via double-headed arrows HH and JJ to show two rotational DOF. The end-effector 16E can resist a torque applied to the object 32 if the axis around which such a torque is applied does not align with either of the axes about which rotation (double-headed arrows HH and II) occurs. Each DOF of the end-effector 16E may have an accompanying joint position sensor $S_P$ (see FIG. 1), omitted from FIG. 4 for clarity, to enable control feedback functionality. That is, position sensor $S_P$ may be positioned at each translatable and rotatable joint of the end-effector 16E to measure the joint position and communicate the measured position to the controller 50 of FIGS. 1 and 2. The controller 50 receives the measured positions (arrow $P_X$ of FIG. 1) and uses this information in controlling the motion of actuated joints of the robotic mechanism 12.

Figure 5:
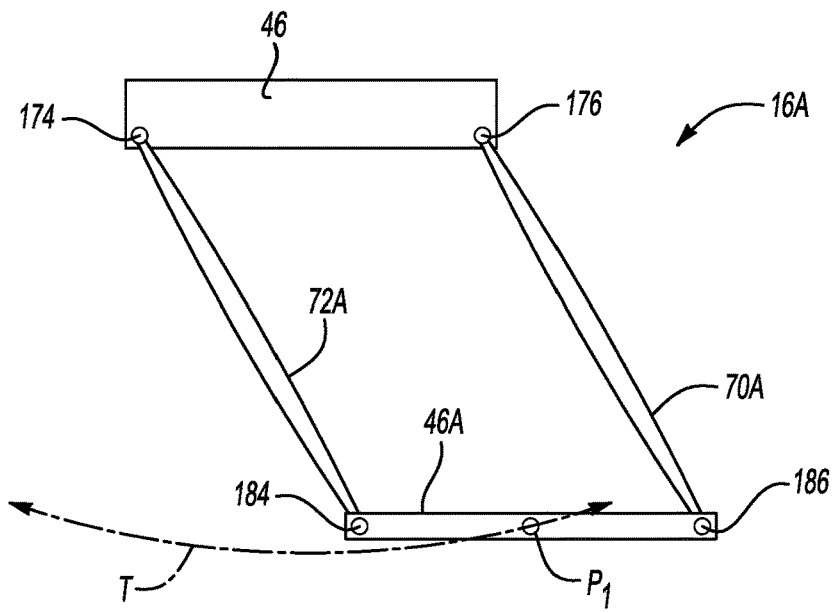
FIG. 5 is a schematic side view illustration of an articulated compliance mechanism in the form of a parallelogram link arrangement with quasi-linear translation occurring in one plane.

FIG. 5 illustrates an articulated compliance mechanism 16A in the form of a basic parallelogram linkage arrangement, or a basic pendulum. In such an embodiment, an upper link 46 may be disposed in parallel with a lower link 46A, with "upper" here referring to closer proximity to the robotic mechanism 12 or 120 of FIGS. 1-3. Transverse links 70A and 72A are rotatably connected to the upper link 46 at revolute joints 176 and 174, respectively. Similarly, the lower link 46A is rotatably connected to the transverse links 70A and 72A at revolute joints 186 and 184, respectively. Motion of the lower link 46A, to which the object 32 is attached directly or via an end-effector 16E (see FIG. 4), results in translation of the lower link 46A, with center point $P_1$ of the lower link 46A following the curved trajectory line (T). While one set of transverse links 70A and 72A are shown in FIG. 5, for added support a parallel set of transverse links 70A and 72A may be used to form a box-type arrangement.

Figure 6:
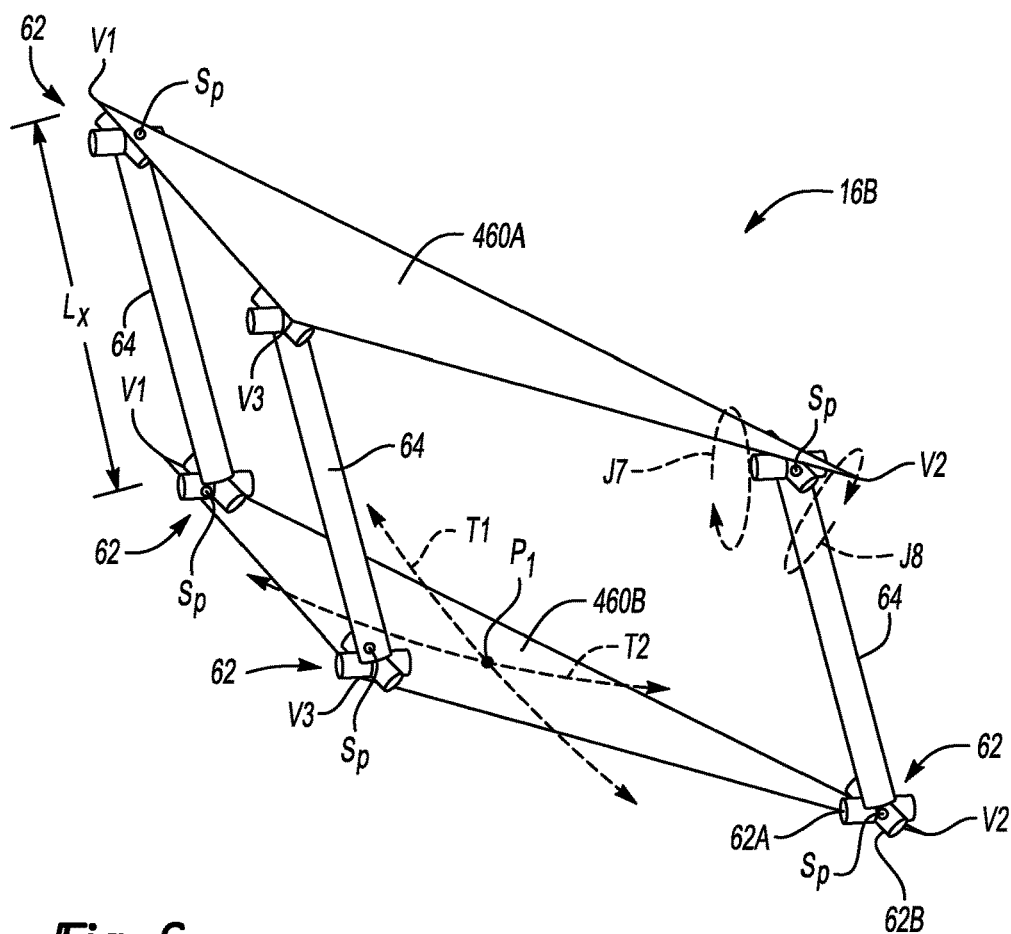
FIG. 6 is a schematic perspective view illustration of an alternative spatial parallelogram embodiment providing two-plane quasi-linear translation.

FIG. 6 depicts an articulated compliance mechanism 16B in the form of a spatial parallelogram linkage arrangement. As with the various above-described embodiments, the articulated compliance mechanism 16B acts as a passive linear compliance mechanism having a plurality of passive/unactuated DOF and a stable equilibrium point that is achieved using gravity, and possibly a resilient member such as a spring, pneumatic cylinder, or load balancer, not shown but similar to the resilient members 48 of FIG. 4, as the restoring force when the object 32 is ultimately released.

The articulated compliance mechanism 16B may include planar, parallel upper and lower members 460A and 460B connected to each other via a set of transverse arm linkages 64. The arm linkages 64 are parallel and of the same length ($L_X$). As shown, the upper and lower members 460A and 460B are embodied as planar triangular members having vertices V1, V2, and V3. In such an embodiment, three of the arm linkages 64 extend between the vertices V1, V2, V3 of the upper and lower members 460A and 460B and connect in parallel via revolute universal joints 62. Each revolute universal joint 62 may be embodied as two distinct revolute joints 62A and 62B as shown. Additional arm linkages 64 may be used in other embodiments for added rigidity. Optionally, one or more resilient members or spring elements may be used at the unactuated joints for a greater restoring force.

Using the construction of FIG. 6, two-dimensional quasi-linear translation is afforded of a center point $P_1$ of the lower link 460B as indicated by trajectory lines T1 and T2. That is, two-dimensional translation of the link is enabled along the surface of an imaginary sphere, with the radius of curvature being equal to the length ($L_X$) of the arm linkages 64.

In view of the foregoing disclosure, various embodiments are possible for providing compliant DOF for use in human-machine or machine-machine interactions in which the operator 20, whether human or machine, directly interacts with the object 32 and/or the articulated compliance mechanism 16. Attendant benefits of the present disclosure include low stiction compared to conventional linear slides, as well as added compactness. The disclosed embodiments provide for self-centering of the object 32, of whatever configuration is desired, with or without the use of springs. The robotic mechanism 12 and the articulated compliance mechanism 16 may be statically balanced in some embodiments such that the articulated compliance mechanism 16 or an end-effector 16E thereof remains in a particular equilibrium position when the object 32 is released by the operator 20.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

What is claimed is:

1. An electromechanical system operable through physical interaction with an operator, the electromechanical system comprising:
    a multi-axis serial robot providing actuated joints and sensors, each of the sensors being configured to measure corresponding joint data indicative of a position or angle of the actuated joints, the multi-axis robot having a distal mounting surface;
    an articulated compliance mechanism connected to the multi-axis robot at the distal mounting surface, and having:
        a plurality of unactuated joints collectively providing multiple degrees of freedom (DOF);
        a plurality of sensors each positioned with respect to a respective one of the unactuated joints, and configured to measure corresponding joint data indicative of a position or angle of the unactuated joints;
        a plurality of linkages interconnected by the unactuated joints, and including a distal output link, wherein the articulated compliance mechanism is configured to enable the operator to translate the distal output link without causing rotation of the distal output link, and with DOF of translation of the distal output link being redundant with DOF of the actuated joints of the multi-axis robot;
    an end-effector connected to the distal output link and having a point of interaction for the physical interaction of the electro-mechanical system with the operator; and
    a controller in communication with the sensors of the multi-axis serial robot and the plurality of sensors of the articulated compliance mechanism, and configured to:
        receive the respective measured joint data therefrom when the operator applies a force at the point of interaction sufficient for translating the distal output link;
        generate control signals in response to the measured joint data; and
        transmit the control signals to the multi-axis robot to thereby translate the mounting surface in response to the translation of the end-effector by the operator.

2. The electromechanical system of claim 1, wherein at least some of the unactuated joints are linear slides.

3. The electromechanical system of claim 1, wherein the electromechanical system is coupled to an object having a weight, and the unactuated joints include a passive vertical translation joint that is statically balanced to support the weight of the object.

4. The electromechanical system of claim 3, wherein the passive vertical translation joint that is statically balanced via at least one of: mechanical springs, load balancers, and pneumatic cylinders.

5. The electromechanical system of claim 1, wherein the unactuated joints include joints of a pendulum arrangement.

6. The electromechanical system of claim 1, wherein the unactuated joints include a parallelogram link arrangement.

7. The electromechanical system of claim 1, wherein the unactuated joints include a parallel link arrangement with planar upper and lower members that are parallel to each other, and that are rotatably connected to each other via a plurality of arm linkages and a plurality of revolute universal joints.

8. The electromechanical system of claim 7, wherein the upper and lower members are triangular members connected to each other by three of the arm linkages through six of the revolute universal joints.

9. The electromechanical system of claim 8, wherein the revolute universal joints respectively include two distinct revolute joints.

10. The electromechanical system of claim 1, wherein some of the unactuated joints include spring elements configured to provide an equilibrium position in the absence of the physical interaction with the operator.

11. An electromechanical system operable through physical interaction with an operator, the electromechanical system comprising:
    a plurality of actuated joints providing multiple actuated degrees of freedom (DOF);
    a plurality of unactuated joints being distal with respect to the actuated joints, and providing multiple unactuated DOF;
    an overhead structure with linear rails providing the actuated joints;
    an articulated compliance mechanism connected to the overhead structure and having a plurality of linkages providing the multiple unactuated DOF in a closed-chain configuration, the linkages including a distal output link, wherein the articulated compliance mechanism is configured to enable the operator to translate the distal output link by applying a force to a point of interaction on the distal output link without also causing rotation of the distal output link, and wherein DOF of translation of the distal output link are redundant with the actuated DOF;
    a plurality of actuators each configured to actuate one or more of the actuated DOF;
    a plurality of sensors each positioned with respect to the actuated joints and the unactuated joints, and each configured to measure corresponding joint data indicative of a position or angle of the respective actuated or unactuated joints; and a controller in communication with the plurality of sensors and configured to receive the measured joint data as feedback signals, generate control signals using the feedback signals, and transmit the control signals to the actuators to thereby translate the mounting surface in response to the translation of the end-effector by the operator.

12. The electromechanical system of claim 11, wherein an object having a weight is coupled to the electromechanical system, and the unactuated joints include a passive vertical translation joint that is statically balanced to support the weight of the object.

13. The electromechanical system of claim 12, wherein the passive vertical translation joint that is statically balanced via at least one of: mechanical springs, load balancers, and pneumatic cylinders.

14. The electromechanical system of claim 11, wherein the articulated compliance mechanism includes a parallel link arrangement with planar upper and lower members that are parallel to each other, and that are rotatably connected to each other via a plurality of arm linkages and a plurality of revolute universal joints.

15. The electromechanical system of claim 14, wherein the upper and lower members are triangular members connected to each other by three of the arm linkages through six of the revolute universal joints.

16. The electromechanical system of claim 15, wherein the revolute universal joints respectively include two distinct revolute joints.

17. An electromechanical system operable through physical interaction with an operator, the electromechanical system comprising:

a plurality of joints providing multiple degrees of freedom (DOF), the plurality of joints including actuated joints providing actuated DOF and unactuated joints providing unactuated DOF, the unactuated joints being distal with respect to the actuated joints;

an overhead structure with linear rails providing at least some of the actuated joints;

linear slides providing at least some of the unactuated DOF;

a plurality of actuators each configured to actuate one or more of the actuated joints;

a plurality of sensors each positioned with respect to a respective one of the actuated and unactuated joints, and each configured to measure corresponding joint data indicative of a position or angle of the respective actuated or unactuated joints; and a controller in communication with the plurality of sensors and configured to receive the measured joint data as feedback signals, generate control signals using the feedback signals, and transmit the control signals to the actuators to thereby control an actuation state of the actuators;

wherein the electromechanical system is configured to enable the operator to translate the distal output link by applying a force to the point of interaction on the distal output link without causing rotation of the distal output link, and wherein the unactuated DOF of translation of the distal output link is redundant with the actuated DOF.

18. The electromechanical system of claim 17, wherein an object having a weight is coupled to the electromechanical system, and wherein the unactuated joints include a passive vertical translation joint that is statically balanced to support the weight of the object.

19. The electromechanical system of claim 18, wherein the passive vertical translation joint that is statically balanced via at least one of: mechanical springs, load balancers, and pneumatic cylinders.

20. The electromechanical system of claim 17, wherein some of the unactuated joints include spring elements configured to provide an equilibrium position of the output link in the absence of the physical interaction with the operator.

* * * * *